(12) United States Patent
Liao

(10) Patent No.: US 11,698,840 B2
(45) Date of Patent: Jul. 11, 2023

(54) TRANSACTION CONSENSUS PROCESSING METHOD AND APPARATUS FOR BLOCKCHAIN AND ELECTRONIC DEVICE

(71) Applicant: Advanced New Technologies Co., Ltd., Grand Cayman (KY)

(72) Inventor: Xiaojun Liao, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/401,092

(22) Filed: Aug. 12, 2021

(65) Prior Publication Data
US 2021/0374020 A1 Dec. 2, 2021

Related U.S. Application Data

(63) Continuation of application No. 17/079,343, filed on Oct. 23, 2020, now Pat. No. 11,144,411, which is a (Continued)

(30) Foreign Application Priority Data

Aug. 31, 2018 (CN) .......................... 201811012581.5

(51) Int. Cl.
*G06F 16/00* (2019.01)
*G06F 11/14* (2006.01)
(Continued)

(52) U.S. Cl.
CPC ...... *G06F 11/1474* (2013.01); *G06F 16/2379* (2019.01); *H04L 9/0894* (2013.01); *H04L 9/14* (2013.01); *G06F 2201/87* (2013.01)

(58) Field of Classification Search
CPC ............ G06F 11/1469; G06F 16/2246; G06F 16/1824; G06F 16/1834; G06F 11/1464; (Continued)

(56) References Cited

U.S. PATENT DOCUMENTS

| 10,901,660 B1 * | 1/2021 | Frandzel ............... G06F 21/602 |
| 11,321,718 B1 * | 5/2022 | Narendranathan ..... G06F 21/64 |

(Continued)

FOREIGN PATENT DOCUMENTS

| CN | 105741095 A | 7/2016 |
| CN | 105847279 A | 8/2016 |

(Continued)

OTHER PUBLICATIONS

Cachin, et al. "Asynchronous Verifiable Information Dispersal", IBM Research, Zurich Research Labaratory, ETH Zurich, Department of Computer Science, 2005, (2 pages).

(Continued)

*Primary Examiner* — Yicun Wu
(74) *Attorney, Agent, or Firm* — Seed IP Law Group LLP

(57) ABSTRACT

A transaction consensus processing method for a blockchain is provided. A target node that initiates a proposition performs compression processing on proposed transaction data based on a compression algorithm, and fragments the compressed transaction data into a number of data fragments based on an erasure code algorithm. The method includes: receiving a data fragment of the transaction data that is sent by the target node in a unicast mode, data fragments sent by the target node to nodes in the unicast mode being different; broadcasting the received data fragment to other nodes, and receiving data fragments of the transaction data that are broadcast by the other nodes; performing data recovery on the received data fragment based on an erasure code reconstruction algorithm, performing decompression processing on the recovered transaction data based on a decompression algorithm to obtain original content of the transaction data, and completing the consensus.

20 Claims, 5 Drawing Sheets

Related U.S. Application Data continuation of application No. PCT/CN2019/096409, filed on Jul. 17, 2019.

(51) Int. Cl.
*G06F 16/23* (2019.01)
*H04L 9/08* (2006.01)
*H04L 9/14* (2006.01)

(58) Field of Classification Search
CPC ..... H04L 63/12; H04L 9/3247; H04L 9/3239; H04L 9/0643; H04L 43/50; H03M 13/154
See application file for complete search history.

(56) References Cited

U.S. PATENT DOCUMENTS

| | | |
|---|---|---|
| 2016/0173364 A1 | 6/2016 | Pitio et al. |
| 2017/0083907 A1 | 3/2017 | McDonough et al. |
| 2017/0140375 A1 | 5/2017 | Kunstel |
| 2017/0228822 A1* | 8/2017 | Creighton, IV ... G06Q 20/3829 |
| 2017/0344987 A1 | 11/2017 | Davis |
| 2018/0060836 A1 | 3/2018 | Castagna |
| 2018/0139278 A1 | 5/2018 | Bathen et al. |
| 2018/0189333 A1* | 7/2018 | Childress ............ H04L 9/50 |
| 2018/0191503 A1 | 7/2018 | Alwar et al. |
| 2018/0241573 A1 | 8/2018 | Ramathal et al. |
| 2018/0276745 A1* | 9/2018 | Paolini-Subramanya ............ G06Q 50/18 |
| 2019/0026146 A1* | 1/2019 | Peffers ............ G06F 9/466 |
| 2019/0058581 A1* | 2/2019 | Wood ............ H04L 9/0637 |
| 2019/0165943 A1 | 5/2019 | Chari et al. |
| 2019/0171365 A1 | 6/2019 | Power et al. |
| 2019/0243980 A1* | 8/2019 | Inamdar ............ H04L 63/0272 |
| 2019/0394175 A1 | 12/2019 | Zhang et al. |
| 2020/0127835 A1 | 4/2020 | Fletcher et al. |

FOREIGN PATENT DOCUMENTS

| | | |
|---|---|---|
| CN | 106529951 A | 3/2017 |
| CN | 106603198 A | 4/2017 |
| CN | 106656974 A | 5/2017 |
| CN | 107728941 A | 2/2018 |
| CN | 107948334 A | 4/2018 |
| CN | 108199842 A | 6/2018 |
| CN | 108389129 A | 8/2018 |
| CN | 109345386 A | 2/2019 |
| CN | 109379387 A | 2/2019 |
| TW | 201138356 A | 11/2011 |
| TW | 201810152 A | 3/2018 |
| WO | WO 2015173434 A1 | 11/2015 |

OTHER PUBLICATIONS

Goodson et al., "Efficient Byzantine-Tolerant Erasure-Coded Storage", International Conference of Dependable Systems and Networks (DSN'04), Computer Society, 2004, (10 pages).

Miller et al., "The Honey Badger of BFT Protocols", Computer and Communications Security, 2016, (12 pages).

Perard et al., "Erasure Code-Based Low Storage Blockchain Node", IEEE Confs on Internet of Things, Green Computing and Communications, Cyber, Physical and Social Computing, Smart Data, Blockchain, Computer and Information Technology, Congress on Cybermatics, 2018, (6 pages).

Hung et al., "Study and Realization of an Improved PBFT Algorithm as an Ethereum Consensus Mechanism," Computer Applications and Software. 34(10) : 288-297, 2017.

Dai et al., "A Low Storage Room Requirement Framework for Distributed Ledger in Blockchain", IEEE, vol. 6 : 22970-22975, 2018.

* cited by examiner

TRANSACTION CONSENSUS PROCESSING METHOD AND APPARATUS FOR BLOCKCHAIN AND ELECTRONIC DEVICE

TECHNICAL FIELD

One or more implementations of the present specification relate to the field of blockchain technologies, and in particular, to a transaction consensus processing method and apparatus for a blockchain and an electronic device.

BACKGROUND

A blockchain technology, also referred to as a distributed ledger technology, is an emerging technology that several computing devices participate in keeping "ledger" to jointly maintain a complete distributed database. The blockchain technology is characterized by decentralization, openness, and transparency, and also, in the blockchain technology, each computing device can participate in database recording, and data can be synchronized rapidly between the computing devices. Therefore, the blockchain technology has been widely applied to many fields.

SUMMARY

The present specification provides a transaction consensus processing method for a blockchain. The blockchain includes a plurality of nodes, a target node of the plurality of nodes that initiates a proposition performs compression processing on proposed transaction data based on a determined compression algorithm, and fragments the compressed transaction data into a number of data fragments based on an erasure code algorithm, and the method includes: receiving a data fragment of the transaction data that is sent by the target node in a unicast mode, data fragments sent by the target node to nodes in the unicast mode being different; broadcasting the received data fragment to other nodes in the blockchain, and receiving data fragments of the transaction data that are broadcast by the other nodes; determining whether a number of received data fragments of the transaction data reaches an erasure code recovery threshold; and in response to determining that the number of received data fragments of the transaction data reaches the erasure code recovery threshold, performing data recovery on the received data fragment based on an erasure code reconstruction algorithm, performing decompression processing on the recovered transaction data based on a decompression algorithm corresponding to the compression algorithm to obtain original content of the transaction data, and completing consensus processing on the obtained original content of the transaction data.

The present specification further provides a transaction consensus processing apparatus for a blockchain. The blockchain includes a plurality of nodes, a target node of the plurality of nodes that initiates a proposition performs compression processing on proposed transaction data based on a determined compression algorithm, and fragments the compressed transaction data into a number of data fragments based on an erasure code algorithm, and the apparatus includes: a receiving module, configured to receive a data fragment of the transaction data that is sent by the target node in a unicast mode, data fragments sent by the target node to nodes in the unicast mode being different; a sending module, configured to broadcast the received data fragment to other nodes in the blockchain, and receive data fragments of the transaction data that are broadcast by the other nodes; a determining module, configured to determine whether a number of received data fragments of the transaction data reaches an erasure code recovery threshold; and a recovery module, configured to: in response to determining that the number of received data fragments of the transaction data reaches the erasure code recovery threshold, perform data recovery on the received data fragment based on an erasure code reconstruction algorithm, perform decompression processing on the recovered transaction data based on a decompression algorithm corresponding to the compression algorithm to obtain original content of the transaction data, and complete consensus processing on the obtained original content of the transaction data.

The present specification further provides an electronic device, including: a processor; and a memory, configured to store a machine-executable instruction, where by reading and executing the machine-executable instruction that is stored in the memory and corresponds to control logic of transaction consensus processing for a blockchain, the processor is configured to: receive a data fragment of transaction data that is sent by a target node in a unicast mode, where the target node that initiates a proposition performs compression processing on the proposed transaction data based on a determined compression algorithm, and fragments the compressed transaction data into a number of data fragments based on an erasure code algorithm, and data fragments sent by the target node to nodes in the unicast mode are different; broadcast the received data fragment to other nodes in the blockchain, and receive data fragments of the transaction data that are broadcast by the other nodes; determine whether a number of received data fragments of the transaction data reaches an erasure code recovery threshold; and in response to determining that the number of received data fragments of the transaction data reaches the erasure code recovery threshold, perform data recovery on the received data fragment based on an erasure code reconstruction algorithm, perform decompression processing on the recovered transaction data based on a decompression algorithm corresponding to the compression algorithm to obtain original content of the transaction data, and complete consensus processing on the obtained original content of the transaction data.

According to the above technical solutions, when proposing the to-be-added transaction data to the secondary nodes, the primary node performs compression processing on the proposed transaction data based on the compression algorithm, and fragments the to-be-added transaction data based on the erasure code algorithm before transmission.

When proposing the transaction data to the secondary nodes, the primary node no longer needs to broadcast the complete transaction data to the secondary nodes, but can send a data fragment obtained after fragmenting the compressed transaction data to each secondary node in the unicast mode. Therefore, data transmission bandwidth consumed for transmitting the to-be-added transaction data to the nodes participating in the consensus can be significantly reduced, and the to-be-added transaction data can be transmitted to the secondary nodes in a short time to complete the consensus, thereby improving consensus processing efficiency.

In addition, because the primary node sends only a data fragment of the transaction data to each secondary node in the unicast mode, the primary node cannot learn of complete content of a complete transaction that the data fragment belongs. Therefore, the following scenarios can be effectively avoided: the primary node selectively sends some specific transactions to other nodes participating in the consensus in the unicast mode, and conduct a selective consensus on some specific transactions. As such, fairness of the consensus can be ensured, and the primary node can be prevented from doing "evil" through the selective consensus.

DESCRIPTION OF IMPLEMENTATIONS

Figure 1:
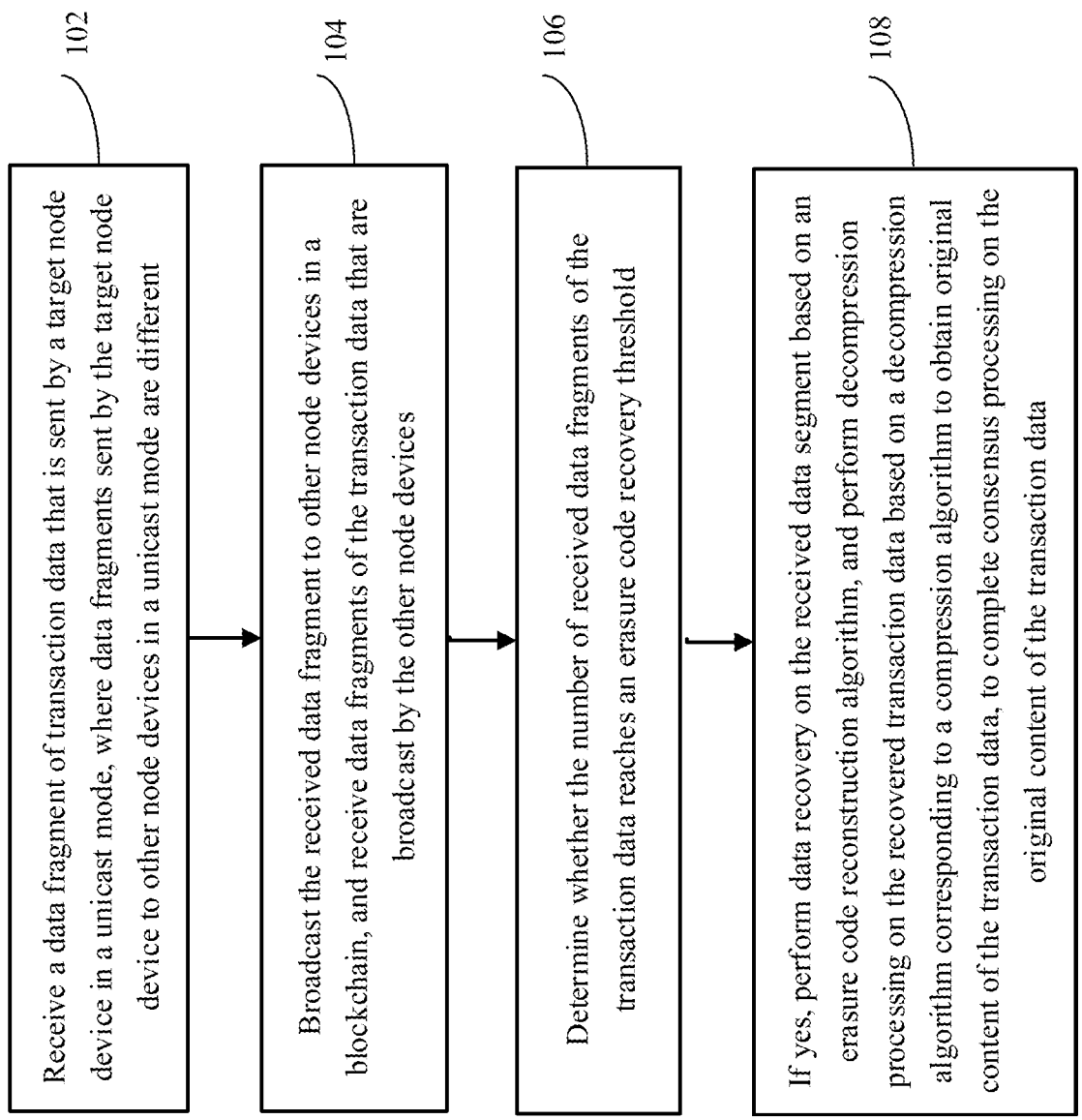
FIG. 1 is a flowchart illustrating a transaction consensus processing method for a blockchain, according to an example implementation.

The present specification is intended to provide technical solutions that, in a consensus processing process of a blockchain, a compression algorithm and an erasure code algorithm are introduced to perform compression processing on to-be-added transaction data and fragment the compressed transaction data before transmission, to reduce data transmission bandwidth consumed for transmitting the to-be-added transaction data to nodes participating in the consensus and improve consensus efficiency.

During implementations, first, in each round of consensus in the blockchain, a target node (or primary node) that initiates a proposition can perform compression processing on proposed transaction data in advance based on a determined, e.g., predetermined or dynamically determined, compression algorithm, fragment the compressed transaction data into a number of data fragments based on an erasure code algorithm, and then send the data fragments obtained through fragmentation to other nodes separately in a unicast mode. The data fragments sent by the primary node to the other node in the unicast mode are different. In the description herein a "primary node" is used, for descriptive purposes only, to refer to a node in a blockchain network that initiates a proposition of transaction data. A "secondary node" is used. For descriptive purposes only, to refer to a node in a blockchain network that does not initiate a proposition of transaction data. A primary node with respect to a proposition of a first transaction data may be a secondary node with respect to a different proposition of a second transaction data. In some implementations, a blockchain network may include one or more primary nodes that are qualified to initiate a proposition of same transaction data. The primary nodes may be predetermined or dynamically determined, e.g., via implementation of a smart contract.

Second, upon receiving a data fragment of the transaction data that is sent by the target node in the unicast mode, each node can continue to broadcast the received data fragment to other nodes in the blockchain, and can further collect data fragments broadcast by the other nodes. In some embodiment, a primary node is among the other nodes that received the data fragment that the target node broadcast. In some implementations, the other nodes that receive the broadcast data fragment may further fragment the received data fragment into further data fragments and broadcast the further data fragments among the nodes and thus becomes a primary node with respect to the further data fragments.

Finally, any node in the blockchain can determine whether the number of collected data fragments of the transaction data reaches an erasure code recovery threshold defined when the erasure code algorithm is used to fragment the transaction data. If yes, it indicates that the currently collected data fragments are sufficient to recover the transaction data. In this case, data recovery can be performed on the collected data fragments based on an erasure code reconstruction algorithm, decompression processing can be further performed on the recovered transaction data based on a decompression algorithm corresponding to the compression algorithm to obtain original content of the transaction data, and consensus processing on the obtained original content of the transaction data can be completed.

According to the above technical solutions, when proposing the to-be-added transaction data to the other nodes, the target node performs compression processing on the proposed transaction data based on the compression algorithm, and fragments the to-be-added transaction data based on the erasure code algorithm before transmission.

When proposing the transaction data to the secondary nodes, the primary node no longer needs to broadcast the complete transaction data to the secondary nodes, but can send a data fragment obtained after fragmenting the compressed transaction data to each node in the unicast mode. Therefore, data transmission bandwidth consumed for transmitting the to-be-added transaction data to the nodes participating in the consensus can be significantly reduced, and the to-be-added transaction data can be transmitted to the secondary nodes in a short time to complete the consensus, thereby improving consensus processing efficiency.

In addition, because the target node sends only a data fragment of the transaction data to each node in the unicast mode, the target node cannot learn of complete content of a complete transaction that the data fragment belongs. Therefore, the following scenarios can be effectively avoided: the target node selectively sends some specific transactions to other nodes participating in the consensus in the unicast mode, and conduct a selective consensus on some specific transactions. As such, fairness of the consensus can be ensured, and the target node can be prevented from doing "evil" through the selective consensus.

FIG. 1 illustrates a transaction consensus processing method for a blockchain, according to an implementation of the present specification. The method is applied to any node in a blockchain network ("blockchain"). The blockchain includes a plurality of nodes, a target node of the plurality of nodes that initiates a proposition performs compression processing on proposed transaction data based on a determined compression algorithm, e.g., predetermined or dynamically determined, and fragments the compressed transaction data into a number of data fragments based on an erasure code algorithm, and the method includes the following steps.

Step 102: Receive a data fragment of the transaction data that is sent by the target node in a unicast mode, where data fragments sent by the target node to nodes in the unicast mode are different.

Step 104: Broadcast the received data fragment to other nodes in the blockchain, and receive data fragments of the transaction data that are broadcast by the other nodes.

Step 106: Determine whether a number of received data fragments of the transaction data reaches an erasure code recovery threshold.

Step 108: If yes, perform data recovery on the received data fragment based on an erasure code reconstruction algorithm, perform decompression processing on the recovered transaction data based on a decompression algorithm corresponding to the compression algorithm to obtain original content of the transaction data, and complete consensus processing on the obtained original content of the transaction data.

The blockchain described in the present specification can specifically include a private blockchain network, a public blockchain network, a consortium blockchain network, and the like. This is not specifically limited in the present specification.

For example, in a scenario, the blockchain can be specifically a consortium blockchain network that includes the following member devices: a server of a third-party payment platform, a server of a domestic bank, a server of an overseas bank, and several user nodes. An operator of the consortium blockchain network can deploy consortium blockchain network-based online services such as cross-border transfer and asset transfer online based on the consortium blockchain network.

A transaction described in the present specification refers to data that is created by a user by using a client of a blockchain and needs to be finally submitted to a distributed database of the blockchain.

Transactions in the blockchain include a transaction in a narrow sense and a transaction in a broad sense. The transaction in the narrow sense refers to a value transfer submitted by a user to the blockchain. For example, in a conventional bitcoin blockchain network, the transaction can be a transfer initiated by the user in the blockchain. The transaction in the broad sense refers to service data with a service/business intention that is submitted by a user to the blockchain. For example, an operator can create a consortium blockchain network based on an actual service requirement, and deploy some other types of online services (for example, a rental service, a vehicle scheduling service, an insurance claim service, a credit service, and a medical service) that are not related to a value transfer in the consortium blockchain network. In such a consortium blockchain network, the transaction can be a service message or a service request with a service/business intention that is submitted by a user to the consortium blockchain network.

It should be noted that a consensus algorithm of the blockchain is not specifically limited in the present specification. In practice, specifically, a Byzantine fault tolerance algorithm can be used as the consensus algorithm, or a non-Byzantine fault tolerance algorithm can be used as the consensus algorithm.

The Byzantine fault tolerance algorithm refers to a distributed fault tolerance algorithm, for example, a PBFT algorithm or a HoneyBadgerBFT algorithm, in which a Byzantine node (e.g., an evil node) needs to be considered in a distributed network including several nodes. If the Byzantine fault tolerance algorithm is used to perform consensus processing in the blockchain network, it is considered that both an evil node and a faulty node exist in the blockchain. Correspondingly, the non-Byzantine fault tolerance algorithm refers to a distributed fault tolerance algorithm, for example, a raft algorithm, in which no Byzantine node is considered in a distributed network including several nodes. If the non-Byzantine fault tolerance algorithm is used to perform consensus processing in the blockchain network, it is considered that no evil node exists and only a faulty node exists in the blockchain.

The target node described in the present specification refers to a node in the blockchain that has latest to-be-added block data to be proposed to all nodes participating in a transaction consensus.

For example, the consensus algorithm supported by the blockchain is the PBFT algorithm. In the PBFT protocol, only an elected primary node has permission to propose transaction data to each secondary node. Therefore, in this scenario, the target node can be specifically an elected primary node.

For another example, the consensus algorithm supported by the blockchain is the HoneyBadgerBFT algorithm. In the HoneyBadgerBFT protocol, all nodes in the blockchain have permission to propose transaction data to each other node. Therefore, in this scenario, the target node can be specifically any node in the blockchain.

The transaction data proposed by the target node and described in the present specification specifically refers to a to-be-added transaction that is collected by the target node and submitted by a user client by using a connected node.

In practice, the target node can initiate a consensus process for a single transaction, or can initiate a consensus process for a created transaction list.

For example, in an implementation, a node can broadcast, in the blockchain network, a transaction submitted by a user by using a user client. The primary node can collect the to-be-added transactions broadcast by various nodes in the blockchain network in a consensus time period of a current round, then create a transaction list based on the collected to-be-added transactions, and transmit the transaction list to other nodes as proposed transaction data.

The following provides descriptions by using an example that the blockchain is a consortium blockchain network, and the consortium blockchain network uses one or more of the PBFT algorithm and the HoneyBadgerBFT algorithm as the consensus algorithm to perform consensus processing on the transaction list proposed by the target node.

1) The blockchain uses the HoneyBadgerBFT algorithm as the consensus algorithm.

The HoneyBadgerBFT consensus algorithm includes a reliable broadcast (RBC) subprotocol and a byzantine agreement (BA) subprotocol. The RBC subprotocol is used to transmit transaction data (for example, a transaction list) proposed by a node to other nodes, and receive transaction data proposed by the other nodes. The RBC subprotocol can ensure that at least $2f+1$ nodes can receive the same proposition when a total number of nodes in the blockchain is $N=3f+1$. The BA subprotocol is mainly used to reach a consensus on a proposition initiated by a single node. An input and an output of the BA subprotocol can only be 0 or 1. When the output is 1, it indicates that the transaction data proposed by the node can enter a final consensus result.

In the present specification, based on an existing transaction data transmission mechanism of the RBC subprotocol of the HoneyBadgerBFT consensus algorithm, a compression and decompression mechanism is introduced to optimize and improve the existing transaction data transmission mechanism of the RBC subprotocol, so as to reduce data transmission bandwidth consumption for performing consensus interaction between nodes in the blockchain using the HoneyBadgerBFT consensus algorithm and improve consensus processing efficiency.

In the consortium blockchain network using the HoneyBadgerBFT consensus algorithm, each node can collect transactions submitted by clients and create a transaction list based on the collected transactions. In this case, the created transaction list is transaction data that is proposed by the target node/primary node and requires consensus processing.

In the consortium blockchain network using the HoneyBadgerBFT consensus algorithm, each node can initiate a consensus process to a transaction list proposed in the consortium blockchain network.

In the present specification, when the target node in the consortium blockchain network proposes a created transaction list to the consortium blockchain network, the target node can perform, based on a compression algorithm used by the consortium blockchain network, compression processing on the transaction list that needs to be proposed.

It should be noted that in the present specification, a specific algorithm type of the compression algorithm used by the consortium blockchain network is not specifically limited, and a person skilled in the art can flexibly select an algorithm based on an actual requirement in practice.

Further, the target node can fragment the compressed transaction list based on an erasure code algorithm, to fragment the transaction list into a number of data fragments.

It should be noted that the number of data fragments obtained by fragmenting the transaction list can be consistent with the total number of nodes in the consortium blockchain network. For example, assuming that there are N nodes in the consortium blockchain network, the transaction list can be fragmented into N data fragments.

A specific process of fragmenting the transaction list based on the erasure code algorithm is omitted for simplicity in the present specification. A person skilled in the art can refer to descriptions in related technologies when implementing the technical solutions of the present specification.

For example, assume that the transaction list is fragmented into N data fragments based on the erasure code algorithm, and the N data fragments include K data blocks and M check blocks. M represents the number of fault-tolerant data fragments in the N data fragments. K represents the minimum number (e.g., an erasure code recovery threshold) of data fragments required to recover the original transaction list. In other words, by using any K data fragments in the N data fragments, original content of the transaction list can be recovered by using an erasure code reconstruction algorithm (e.g., an inverse algorithm of the erasure code algorithm).

In the present specification, after the target node fragments the compressed transaction list based on the erasure code algorithm, based on the existing transaction data transmission mechanism of the RBC subprotocol, the target node can send a VAL message to each other node in the unicast mode to send the data fragments obtained through fragmentation to the other nodes separately. The VAL message is used by the node that initiates the proposition to broadcast the transaction list to the other consensus nodes. The data fragments sent by the target node to the other nodes need to be different.

It should be noted that, in addition to the data fragment that needs to be synchronized to each other node, the VAL message can include check information used to perform validity and integrity check on the data fragment included in the VAL message.

In an illustrated implementation, after fragmenting the compressed transaction list based on the erasure code algorithm, the target node can construct a Merkle tree based on hash values of the N data fragments obtained through fragmentation, and then add a hash value corresponding to a root node of the constructed Merkle tree, and hash values of neighboring nodes, on other branches, of a node of the Merkle tree that corresponds to a hash value of a data fragment to the VAL message as the above check data.

For example, based on the RBC subprotocol, a format of the VAL message includes a View field, a RootHash field, a Branches field, and a BlockData field.

The View field is used to include a view number. The view number is usually an integer varying consecutively, representing the number of rounds of successfully completed consensuses in the consortium blockchain network. The BlockData field is used to include a data fragment, the RootHash field is used to include the hash value corresponding to the root node of the Merkle tree, and the Branches field is used to include the hash values of the neighboring nodes, on the other branches, of the node of the Merkle tree that corresponds to the hash value of the data fragment.

In the present specification, a node receiving the VAL message can perform verification on the content included in the received VAL message according to the RBC subprotocol.

For example, during implementation, the node receiving the VAL message can reconstruct a Merkle tree based on the hash value of the data fragment included in the VAL message and the hash values of the neighboring nodes, on the other branches, of the node of the Merkle tree that corresponds to the hash value of the data fragment. Then, the node can compare a hash value of a root node of the reconstructed Merkle tree with the hash value of the root node of the Merkle tree included in the VAL message to determine whether they are the same, to complete verification on the data fragment. If the hash value corresponding to the root of the reconstructed Merkle tree does not change, it is considered that the validity verification on the data fragment succeeds. Otherwise, it can be considered that the data fragment included in the VAL message is invalid, and in this case, the data fragment can be discarded.

In the present specification, after the data fragment included in the VAL message is verified, the node receiving the VAL message can obtain and store the data fragment included in the VAL message, and send the received data fragment to other nodes, e.g., by broadcasting an ECHO message to each other node based on the existing transaction data transmission mechanism of the RBC subprotocol. The ECHO message is used to synchronize, by using a network transmission method similar to Gossip, the data received by the node to each other node. A data format of the ECHO message is the same as that of the VAL message, and the details are omitted for simplicity.

Correspondingly, a node receiving the ECHO message can still perform verification on content included in the ECHO message in a similar way according to the RBC subprotocol. Detailed description of a specific verification process is omitted for simplicity.

After the data fragment included in the ECHO message is verified, the node receiving the ECHO message can obtain and store the data fragment included in the ECHO message, and further determine whether the number of received ECHO messages broadcast by other nodes (including an ECHO message broadcast by the node itself) reaches $2f+1$.

Herein, f represents the number of fault-tolerable nodes in the HoneyBadgerBFT algorithm, a specific value of f can be obtained through conversion according to an equation $N=3f+1$, and N represents the total number of nodes in the consortium blockchain network.

If the number of received ECHO messages reaches $2f+1$, the node can further determine whether the number of collected and/or stored data fragments reaches an erasure code recovery threshold supported by the erasure code algorithm. If yes, the node can immediately perform data recovery calculation on the collected data fragments based on the erasure code reconstruction algorithm to recover the original content of the transaction list.

A specific process of performing data recovery calculation on the collected data fragments based on the erasure code reconstruction algorithm is omitted for simplicity in the present specification. A person skilled in the art can refer to descriptions in related technologies when implementing the technical solutions of the present specification.

In an illustrated implementation, if a specific value of the erasure code recovery threshold is larger than 2f+1, the node may not have sufficient data fragments to recover the original content of the to-be-added transaction list. Therefore, in the present specification, the specific value of the erasure code recovery threshold supported by the erasure code algorithm needs to be less than or equal to 2f+1. For example, the value can be exactly equal to 2f+1.

As such, when fragmenting the transaction list based on the erasure code algorithm, the primary node can control the final number of data fragments obtained through fragmentation based on the number f of faulty-tolerable nodes supported by the HoneyBadgerBFT algorithm, so that data fragments obtained by fragmenting the transaction list can be as small as possible while it is ensured that the node has sufficient data fragments to recover the original content of the to-be-added transaction list.

In the present specification, after the node performs data recovery calculation on the collected data fragments based on the erasure code algorithm to recover the original content of the transaction list, because a data fragment transmitted by each node is a data fragment obtained after fragmenting the compressed transaction list, the node obtains only the compressed transaction list after performing data recovery on the collected data fragments based on the erasure code reconstruction algorithm.

In this case, after completing the data recovery calculation, the node can obtain the original content of the transaction list by performing decompression processing on a recovered compressed transaction list based on a decompression algorithm corresponding to the compression algorithm, and further perform validity and integrity check on the recovered transaction list.

For example, in practice, the ECHO message can also include, as check data, the hash value of the root node of the Merkle tree and the hash values of the neighboring nodes, on the other branches, of the node of the Merkle tree that corresponds to the hash value of the data fragment. After performing verification on the original content of the recovered transaction list, the node still fragments the recovered transaction list based on the erasure code algorithm to obtain N data fragments, reconstructs a Merkle tree based on the N data fragments, and compares a hash value of a root node of the reconstructed Merkle tree with the hash value of the root node of the Merkle tree included in the ECHO message. If they are the same, it indicates that the validity and integrity check on the recovered transaction list succeeds, and the node receives a valid and complete transaction list proposed by the target node.

Further, after the validity and integrity check on the original content of the recovered transaction list succeeds, the node can locally store the recovered transaction list, and broadcast a ready message to each other node based on the existing transaction data transmission mechanism of the RBC subprotocol, to notify the other nodes that the node receives a valid transaction list proposed by the target node.

In addition, after receiving a ready message, the node can perform verification on the ready message, to determine whether a transaction list that is proposed by the target node and received by another node is exactly the same as the transaction list that is proposed by the target node and received by the device.

For example, based on the RBC subprotocol, a format of the ready message includes a View field, a ProposeId field, and a RootHash field.

The View field is used to include a view number, the ProposeId field is used to include a sequence number of the node that initiates the current proposition (e.g., a sequence number of the target node), and the RootHash field is used to include a hash value corresponding to a root node of a Merkle tree of the current proposition.

After receiving the ready message, the node can fragment the verified transaction list that is proposed by the target node and locally stored, reconstruct a Merkle tree based on N data fragments obtained through fragmentation, and compare a hash value of a root node of the reconstructed Merkle tree with the hash value included in the ready message, to verify whether a transaction list that is proposed by the target node and received by a node sending the ready message is exactly the same as the transaction list that is proposed by the target node and received by the device. If they are the same, the ready message is verified.

Further, after the received ready message is verified, the node can determine whether the number of received ready messages broadcast by other nodes (including a ready message broadcast by the node itself) reaches 2f+1. If the number of received ready messages reaches 2f+1, it means that 2f+1 nodes in the current consortium blockchain network all receive the same transaction list proposed by the target node. In this case, a next phase of the HoneyBadgerBFT consensus algorithm can be entered, to perform consensus processing on the transaction list proposed by the target node according to the BA subprotocol of the HoneyBadgerBFT consensus algorithm, and determine, based on an output result of the BA subprotocol, whether the transaction list proposed by the target node can enter a final consensus result.

A specific process of performing consensus processing on the transaction list proposed by the target node according to the BA subprotocol is omitted for simplicity in the present specification.

(2) The blockchain uses the PBFT algorithm as the consensus algorithm.

In the present specification, based on three existing phases of pre-prepare, prepare, and commit in the PBFT algorithm, an erasure code algorithm is introduced to optimize and improve an existing transaction data transmission mechanism in the pre-prepare and prepare phases of the PBFT algorithm, so as to reduce data transmission bandwidth consumption for performing consensus interaction between the primary node and the secondary nodes and improve consensus processing efficiency.

In the present specification, before each round of consensus in the consortium blockchain network starts, one primary node (e.g., the target node) can be elected from nodes in the consortium blockchain network.

For example, based on the PBFT algorithm, before each round of consensus in the consortium blockchain network starts, one primary node can be calculated for the current round according to the following equation:

$$P = v \bmod R, \text{ where}$$

P represents a calculated sequence number of the primary node of the current round of consensus and v represents a current view number of the consortium blockchain network. The view number is usually an integer varying consecutively, representing the number of rounds of successfully completed consensuses in the consortium blockchain network. For example, after a round of consensus is successfully completed, and the elected primary node successfully writes a new block into the consortium blockchain network, the view number can automatically increase by 1. R represents a total number of nodes in the consortium blockchain network.

Each node can perform the above calculation, and perform matching on the calculated sequence number of the primary node and a sequence number of the device to determine whether it is elected as the primary node.

If a node determines that it is not elected as the primary node, the node can broadcast a received transaction submitted by a client to nodes in the consortium blockchain network.

If a node determines that it is elected as the primary node, the node can collect transactions broadcast by user clients in a consensus time period of the current round, and create a transaction list based on the collected transactions.

In the present specification, when the primary node proposes the created transaction list to other nodes, the primary node can perform, based on a compression algorithm used by the consortium blockchain network, compression processing on the transaction list that needs to be proposed.

Further, the primary node can fragment the proposed transaction list based on an erasure code algorithm, to fragment the transaction list into a number of data fragments.

When the primary node completes fragmenting the transaction list based on the erasure code algorithm, the primary node can send the data fragments obtained through fragmentation to other nodes separately, by sending a pre-prepare message to each secondary node. In the present specification, the data fragments sent by the primary node to the secondary nodes need to be different.

Based on an existing PBFT protocol, the primary node can add the complete transaction list to a pre-prepare message, and then broadcast the pre-prepare message to nodes in the consortium blockchain network, to transmit the complete transaction list to secondary nodes that need to participate in a transaction consensus in the consortium blockchain network.

However, based on an existing transaction data transmission mechanism of the PBFT protocol, because the pre-prepare message needs to include the complete transaction list, a large number of data copies are generated when the pre-prepare message is being broadcast. For example, based on the total number N of nodes in the consortium blockchain network, N copies of the pre-prepare message need to be made, and then are broadcast. Therefore, in the PBFT protocol, a large amount of network bandwidth of the consortium blockchain network is occupied to transmit the transaction data, and a relatively high requirement is imposed on bandwidth performance of the consortium blockchain network. Once the bandwidth performance of the consortium blockchain network is insufficient, the to-be-added transaction list cannot be transmitted to other secondary nodes participating in the consensus in a short time.

In view of this, in the present specification, the existing transaction data transmission mechanism in the pre-prepare and prepare phases of the PBFT algorithm are optimized and improved.

The pre-prepare message sent by the primary node to each secondary node does not include the complete transaction list, but includes only one data fragment of the transaction list.

In addition, a method used by the primary node to transmit the pre-prepare message to each other secondary node is changed from broadcasting the pre-prepare message to all other nodes to sending a pre-prepare message to each secondary node separately in the unicast mode. For example, pre-prepare messages can be constructed separately for ones of the secondary nodes, where the pre-prepare messages include different data fragments, and then the constructed pre-prepare messages are sent to the secondary nodes one by one, so that the secondary nodes receive different data fragments.

The secondary node receiving the pre-prepare message can first perform verification on the received pre-prepare message according to the PBFT algorithm, to determine whether to accept the received pre-prepare message.

In the present specification, performing verification on the received pre-prepare message is a process of performing verification on content included in the received pre-prepare message. Detailed description of a specific verification process is omitted in the present specification.

For example, according to the PBFT algorithm, the pre-prepare message can include information such as to-be-added transaction data (a data fragment in the present specification), a view number v, a digest of the to-be-added transaction data (a digest of the data fragment in the present specification), and a digital signature. Correspondingly, in the present specification, the following verification process can be specifically used to perform verification on the pre-prepare message:

(1) Verify whether the view number v is consistent with a locally recorded view number.

(2) Perform verification on the digital signature in the pre-prepare message.

(3) Verify whether the data fragment included in the pre-prepare message is valid.

For example, during implementation, the primary node can construct a Merkle tree based on all data fragments, and add a hash value of each branch node of the Merkle tree to the pre-prepare message. When performing verification on the data fragment included in the received pre-prepare message, the node can recalculate a hash value of the data fragment included in the pre-prepare message, and reconstruct a Merkle tree based on the hash value and the hash value of each branch node of the Merkle tree included in the pre-prepare message. Then, the node makes a comparison on a hash value corresponding to a root of the reconstructed Merkle tree, to perform verification on the data fragment. If the hash value corresponding to the root of the reconstructed Merkle tree does not change, it is considered that the validity verification on the data fragment succeeds. Otherwise, it can be considered that the data fragment included in the pre-prepare message is invalid, and in this case, the data fragment can be discarded.

Certainly, in implementations, content included in the pre-prepare message can also be extended based on an actual requirement. For example, the pre-prepare message can further include a consensus height h. The consensus height h is functionally similar to the view number v, and is usually an integer varying consecutively, representing the number of consensus rounds (instead of representing the number of rounds of successful consensuses) in the consortium blockchain network. For example, in a round of consensus, if a primary node is faulty, an attempt to switch is usually triggered, and a primary node is re-elected. In this case, a consensus height h can immediately increase by 1. Because this round of consensus has not been successful, a view number v does not increase by 1, and remains unchanged at the original view number v.

In this case, for the verification on the pre-prepare message, the following verification can be performed besides the above verification process.

(4) Verify whether the consensus height his consistent with a locally recorded consensus height h.

After the node receiving the pre-prepare message performs the above verification process, if the verification succeeds, it indicates that the node accepts the pre-prepare message. In this case, the node can obtain and store the data fragment included in the pre-prepare message, and enter the prepare phase of the PBFT protocol, to broadcast a prepare message confirming the pre-prepare message to each other node in the consortium blockchain network. A format of content included in the prepare message can be consistent with that of the pre-prepare message.

Based on the existing PBFT protocol, the prepare message broadcast by the node to each other node in the consortium blockchain network usually includes only data such as a view number v and a digest of the to-be-added transaction data. In the present specification, the format of the prepare message can be further extended, and each node can also add, to the prepare message, a data fragment sent by the primary node by using the pre-prepare message in the unicast mode.

Each node can broadcast a prepare message including a data fragment to each other node in the consortium blockchain network, to further transmit the received data fragment sent by the primary node in the unicast mode to each other node in the consortium blockchain network.

In addition, each node can also receive a prepare message broadcast by each other secondary node, and perform verification on the received prepare message, to determine whether to accept the received prepare message. For a specific process of performing verification on the received prepare message, references can be made to the specific process of performing verification on the pre-prepare message. Details are omitted for simplicity in the present specification.

If the verification succeeds, it indicates that the node accepts the received prepare message.

The node can obtain and store a data fragment included in the prepare message.

In addition, the node can further determine whether the number of received prepare messages broadcast by other nodes (including a prepare message broadcast by the node itself) reaches 2f+1.

Herein, f represents the number of fault-tolerable nodes in the PBFT algorithm, a specific value off can be obtained through conversion according to an equation N=3f+1, and N represents the total number of nodes in the consortium blockchain network.

If the number of received prepare messages reaches 2f+1, the node can enter a commit phase of the PBFT protocol. The node can broadcast a commit message to each other node in the consortium blockchain network, and continue to complete the consensus processing process of the original content of the transaction list.

In the present specification, after broadcasting the commit message to each other node in the consortium blockchain network, the node in the consortium blockchain network can also receive a commit message broadcast by each other node, and perform verification on the received commit message to determine whether to accept the received commit message.

A format of content included in the commit message can be consistent with the formats of the pre-prepare message and the prepare message. However, it should be emphasized that the digest of the to-be-added transaction data included in the pre-prepare message and the prepare message is a data digest of the transaction list, while in the commit phase, because the node has recovered the complete transaction list, the commit message can include a digest of the recovered complete transaction list.

For a specific process of performing verification on the received commit message, references can be made to the specific process of performing verification on the pre-prepare message. Details are omitted for simplicity in the present specification.

If the verification succeeds, it indicates that the node accepts the received commit message, and the node can further determine whether the number of received commit messages broadcast by other nodes (including a commit message broadcast by the node itself) reaches 2f+1.

If the number of received commit messages reaches 2f+1, the node can further determine whether the number of collected and/or stored data fragments reaches an erasure code recovery threshold supported by the erasure code algorithm. If yes, the node can immediately perform data recovery calculation on the collected data fragments based on the erasure code reconstruction algorithm to recover the original content of the transaction list.

A specific process of performing data recovery calculation on the collected data fragments based on the erasure code reconstruction algorithm is omitted for simplicity in the present specification. A person skilled in the art can refer to descriptions in related technologies when implementing the technical solutions of the present specification.

In an illustrated implementation, if a specific value of the erasure code recovery threshold is larger than 2f+1, the secondary node may not have sufficient data fragments in the commit phase to recover the original content of the to-be-added transaction list. Therefore, in the present specification, the specific value of the erasure code recovery threshold supported by the erasure code algorithm needs to be less than or equal to 2f+1. For example, the value can be exactly equal to 2f+1.

As such, when fragmenting the transaction list based on the erasure code algorithm, the primary node can control the final number of data fragments obtained through fragmentation based on the number f of faulty-tolerable nodes supported by the PBFT algorithm, so that data fragments obtained by fragmenting the transaction list can be as small as possible while it is ensured that the data fragments are sufficient to recover the original content of the to-be-added transaction list in the commit phase.

In the present specification, after the node performs data recovery calculation on the collected data fragments based on the erasure code algorithm to recover the original content of the transaction list, because a data fragment transmitted by each node is a data fragment obtained after fragmenting the compressed transaction list, the node obtains only the compressed transaction list after performing data recovery on the collected data fragments based on the erasure code reconstruction algorithm.

In this case, after completing the data recovery calculation, the node can obtain the original content of the transaction list by performing decompression processing on a recovered compressed transaction list based on a decompression algorithm corresponding to the compression algorithm.

In the above implementation, descriptions are provided by using an example that the consortium blockchain network uses each of the PBFT algorithm and the HoneyBadgerBFT algorithm as the consensus algorithm to perform consensus processing on the transaction list proposed by the target node.

It should be further noted that in the present specification, both the target node in the HoneyBadgerBFT consensus algorithm and the primary node in the PBFT algorithm can further preprocess the transaction list based on a supported related algorithm before fragmenting the transaction list.

In another illustrated implementation, before the transaction list is fragmented, encryption preprocessing can be further performed on the transaction list, and encryption processing can be performed on the transaction list based on a determined, e.g., predetermined or dynamically determined, encryption algorithm and an encryption key.

The encryption algorithm used is not specifically limited in the present specification. For example, in practice, the encryption algorithm can be a symmetric encryption algorithm, or can be an asymmetric encryption algorithm.

After the encryption processing on the transaction list is completed, the encrypted transaction list is fragmented based on the erasure code algorithm, to fragment the encrypted transaction list into the number of data fragments.

Correspondingly, when the original transaction list is recovered based on the collected data fragments, because a data fragment transmitted by each node is a data fragment obtained by fragmenting the encrypted transaction list, the node obtains only the encrypted transaction list after performing data recovery on the collected data fragments based on the erasure code reconstruction algorithm.

In this case, after completing the data recovery calculation, the node can obtain the original content of the transaction list by performing decryption processing on a recovered encrypted transaction list based on a decompression algorithm corresponding to the compression algorithm and a decryption key corresponding to the encryption key, to complete the consensus processing on the original content of the transaction list. Specific implementation details are omitted for simplicity.

In an illustrated implementation, the encryption algorithm can be specifically a threshold encryption algorithm. The decryption algorithm can be specifically a threshold decryption algorithm corresponding to the threshold encryption algorithm.

In this scenario, the decryption key can be specifically fragmented into a number of sub-keys, and the sub-keys are held by nodes respectively.

It should be noted that the number of sub-keys obtained by fragmenting the decryption key can be consistent with the total number of nodes in the consortium blockchain network. For example, assuming that there are N nodes in the consortium blockchain network, the decryption key can be fragmented into N sub-keys, which are held by the N nodes in the consortium blockchain network respectively.

In this case, the node can further collect sub-keys held by other nodes, and determine whether the number of collected sub-keys reaches a determined, e.g., predetermined or dynamically determined, decryption threshold. For example, when the decryption threshold is N, it indicates that N nodes need to jointly decrypt encrypted data based on held sub-keys (e.g., a part of the decryption key).

A specific method used by the node to collect the sub-keys held by the other nodes is not specifically limited in the present specification.

For example, the consensus algorithm used in the consortium blockchain network is still the PBFT algorithm. The node can add a sub-key held by the node to a commit message exchanged with another node.

For another example, the consensus algorithm used in the consortium blockchain network is still the HoneyBadgerBFT algorithm. The node can add a sub-key held by the node to an ECHO message exchanged with another node.

Certainly, in practice, each node can define an interactive message used to transmit a held sub-key, and synchronize the sub-key held by the node to another node by using the interactive message.

If the number of sub-keys collected by the node reaches the determined decryption threshold, it indicates that the node has sufficient fragments to reconstruct the decryption key. In this case, the node can perform reconstruction processing on the decryption key based on the collected sub-keys to recover the original decryption key, and then obtain the original content of the transaction list by performing decryption processing on a recovered encrypted transaction list based on the threshold decryption algorithm and the recovered original decryption key.

A specific process of reconstructing the decryption key based on the collected sub-keys is omitted for simplicity in the present specification. A person skilled in the art can refer to descriptions in related technologies when implementing the technical solutions of the present specification.

For example, fragmenting the decryption key and recovering the decryption key based on the collected sub-keys can also be implemented by using an erasure code technology. A specific process is omitted for simplicity.

As such, before fragmenting the transaction list, the primary node performs encryption processing on the transaction list in advance, so that data security of sending a data fragment to each node can be effectively improved, and some unauthorized nodes cannot view the original content of the transaction list even if they collect sufficient data fragments to recover the transaction list, thereby improving data security of consensus interaction between the nodes.

It should be further noted that, in the above implementation, detailed descriptions are provided by using the example that the existing transaction data transmission mechanisms of the PBFT algorithm and the HoneyBadgerBFT algorithm are used to transmit the to-be-added transaction list to each node participating in the consensus.

It should be emphasized that, in practice, when the to-be-added transaction list needs to be transmitted to each node participating in the consensus, in addition to using the existing transmission mechanism in the consensus algorithm of the consortium blockchain network to transmit the transaction list, a separate transmission protocol can be defined to perform the same function.

In addition, in the above implementation, only the PBFT algorithm and the HoneyBadgerBFT algorithm are used as examples of the consensus algorithm in the consortium blockchain network for description. Clearly, in practice, the technical solutions of the present specification can also be applied to another form of consensus algorithm used in the consortium blockchain network.

In other words, the transmission logic shown in steps 102 to 106 can be applied to other similar consensus algorithms such as a raft algorithm besides the PBFT algorithm and the HoneyBadgerBFT algorithm. Specific implementation details are omitted in the present specification. A person skilled in the art can refer to the descriptions in the above implementation when implementing the technical solutions of the present specification.

Figure 2:
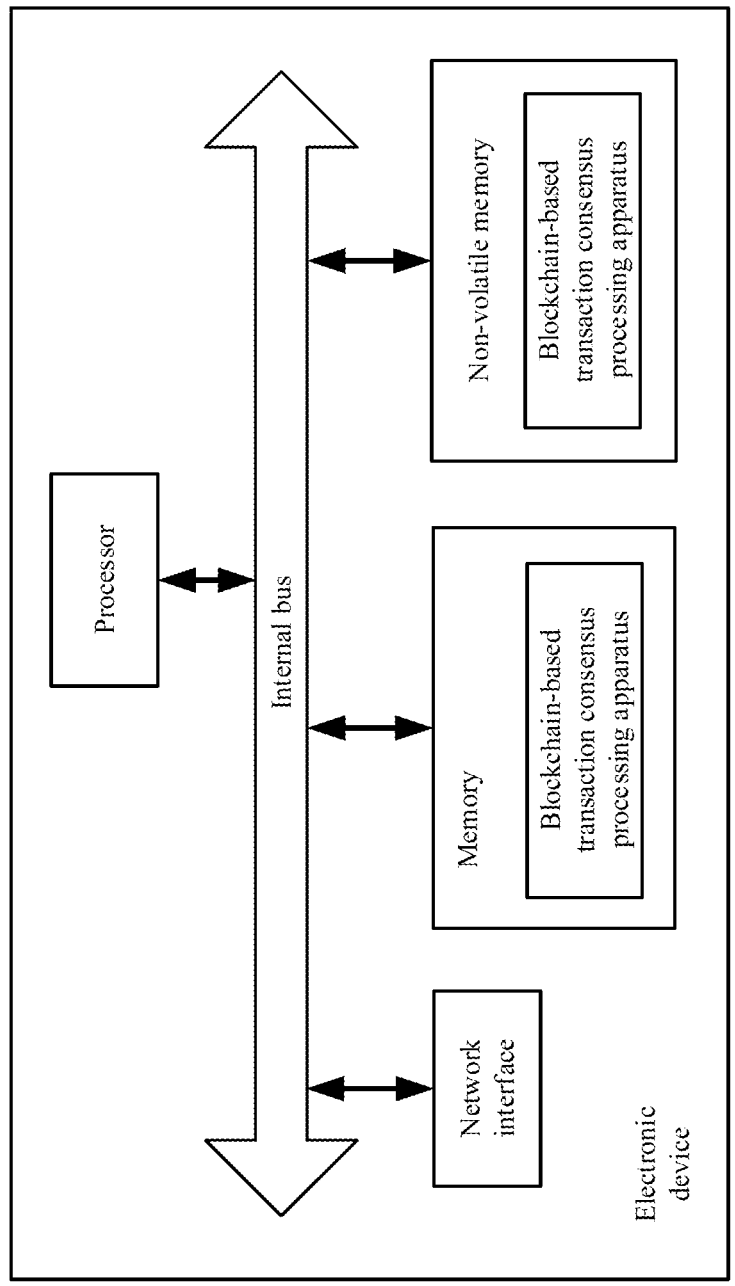
FIG. 2 is a schematic structural diagram illustrating an electronic device, according to an example implementation.

Corresponding to the above method implementation, the present specification further provides an implementation of a transaction consensus processing apparatus for a blockchain. The implementation of the transaction consensus processing apparatus for the blockchain in the present specification can be applied to an electronic device. The apparatus implementation can be implemented by software, hardware, or a combination of hardware and software. Software implementation is used as an example. As a logical apparatus, the apparatus is formed by reading a corresponding computer program instruction in a non-volatile memory to a memory by a processor of an electronic device where the apparatus is located. In terms of hardware, FIG. 2 is a hardware structural diagram illustrating an electronic device where the transaction consensus processing apparatus for the blockchain is located in the present specification. In addition to a processor, a memory, a network interface, and a non-volatile memory shown in FIG. 2, the electronic device where the apparatus is located in the implementations can usually include other hardware based on an actual function of the electronic device. Details are omitted for simplicity.

Figure 3:
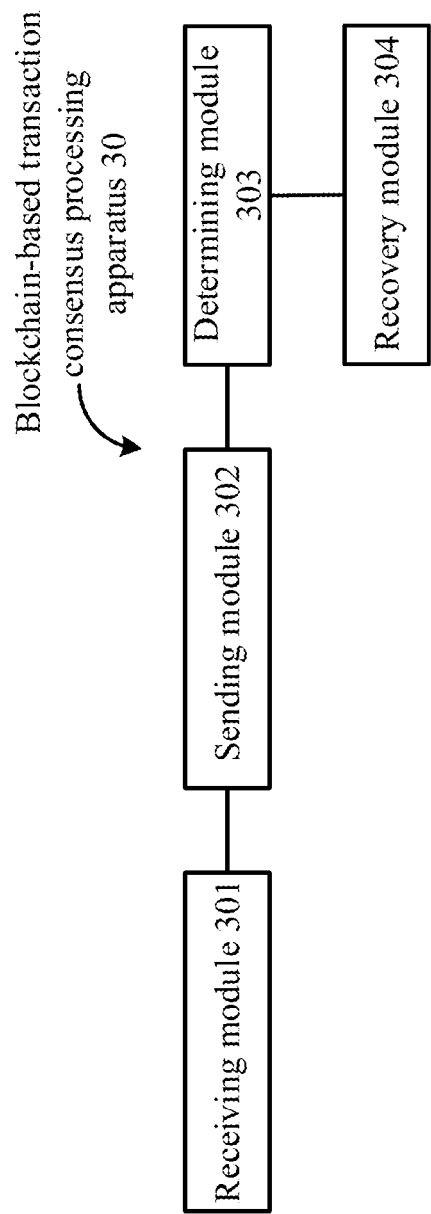
FIG. 3 is a block diagram illustrating a transaction consensus processing apparatus for a blockchain, according to an example implementation.

FIG. 3 is a block diagram illustrating a transaction consensus processing apparatus for a blockchain, according to an example implementation of the present specification.

Referring to FIG. 3, the transaction consensus processing apparatus 30 for the blockchain can be applied to the above electronic device shown in FIG. 2, and includes a receiving module 301, a sending module 302, a determining module 303, and a recovery module 304.

The receiving module 301 is configured to receive a data fragment of transaction data that is sent by a target node in a unicast mode, where the target node that initiates a proposition performs compression processing on the proposed transaction data based on a determined compression algorithm, and fragments the compressed transaction data into a number of data fragments based on an erasure code algorithm, and data fragments sent by the target node to nodes in the unicast mode are different; the sending module 302 is configured to broadcast the received data fragment to other nodes in a blockchain, and receive data fragments of the transaction data that are broadcast by the other nodes; the determining module 303 is configured to determine whether a number of received data fragments of the transaction data reaches an erasure code recovery threshold; and the recovery module 304 is configured to: if yes, perform data recovery on the received data fragments based on an erasure code reconstruction algorithm to obtain original content of the transaction data, and complete consensus processing on the obtained original content of the transaction data.

In this implementation, the apparatus 30 further includes: a fragmentation module 305 (not shown in FIG. 3), configured to generate transaction data proposed by the node, and perform compression processing on the transaction data proposed by the node based on the determined compression algorithm, and fragment the compressed transaction data into a number of data fragments based on the erasure code algorithm; and the sending module 302 is further configured to: send the number of data fragments to other nodes separately in the unicast mode.

In this implementation, a consensus algorithm of the blockchain is a HoneyBadgerBFT algorithm; and the receiving module 301 is configured to: receive a VAL message sent by the target node in the unicast mode, where the VAL message includes the obtained data fragment of the transaction data; and obtain and store the data fragment in the VAL message.

In this implementation, a consensus algorithm of the blockchain is a HoneyBadgerBFT algorithm; and the sending module 302 is configured to: broadcast an ECHO message to the other nodes in the blockchain, where the ECHO message includes the received data fragment, so that upon receiving the ECHO message, the other nodes obtain and store the data fragment in the ECHO message.

In this implementation, a consensus algorithm of the blockchain is a PBFT algorithm; and the receiving module 301 is configured to: receive a pre-prepare message sent by the target node in the unicast mode, where the pre-prepare message includes the obtained data fragment of the transaction data; and obtain and store the data fragment in the pre-prepare message.

In this implementation, a consensus algorithm of the blockchain is a PBFT algorithm; and the sending module 302 is configured to: broadcast a prepare message to the other nodes in the blockchain, where the prepare message includes the received data fragment, so that upon receiving the prepare message, the other nodes obtain and store the data fragment in the prepare message.

In this implementation, the fragmentation module 305 is configured to: perform encryption processing on the proposed transaction data based on a determined encryption algorithm and an encryption key; and fragment the encrypted transaction data into the number of data fragments based on the erasure code algorithm; and the recovery module 304 is configured to: perform data recovery on the received data fragment based on the erasure code reconstruction algorithm; and obtain the original content of the transaction data by performing decryption processing on the recovered transaction data based on a decryption algorithm corresponding to the encryption algorithm and a decryption key corresponding to the encryption key.

In this implementation, the encryption algorithm is a threshold encryption algorithm, the decryption algorithm is a threshold decryption algorithm corresponding to the threshold encryption algorithm, the decryption key is fragmented into a number of sub-keys, and the sub-keys are held by nodes respectively; and the recovery module 304 is further configured to: collect sub-keys held by the other nodes; determine whether the number of collected sub-keys reaches a determined decryption threshold; and if yes, reconstruct the decryption key based on the collected sub-keys, and perform decryption processing on the recovered transaction data based on the threshold decryption algorithm corresponding to the threshold encryption algorithm and the decryption key.

In this implementation, the transaction data proposed by the target node is a transaction list, and the number is a total number of nodes in the blockchain.

In this implementation, the blockchain is a consortium blockchain network.

For an implementation process of functions and roles of each module in the apparatus, references can be made to an implementation process of a corresponding step in the above method. Details are omitted herein for simplicity.

Because apparatus implementations basically correspond to method implementations, for related parts, references can be made to related descriptions in the method implementations. The above apparatus implementations are merely examples. The modules described as separate parts may or may not be physically separate, and parts displayed as modules may or may not be physical modules, and can be located in one position, or can be distributed on a plurality of network modules. Some or all of the modules can be selected based on actual requirements to achieve the objectives of the solutions of the present specification. A person of ordinary skill in the art can understand and implement the implementations of the present specification without making innovative efforts.

The system, apparatus, or module illustrated in the above implementations can be specifically implemented by using a computer chip or an entity, or can be implemented by using a product having a certain function. A typical implementation device is a computer, and the computer can be specifically a personal computer, a laptop computer, a cellular phone, a camera phone, a smartphone, a personal digital assistant, a media player, a navigation device, an email receiving and sending device, a game console, a tablet, a wearable device, or any combination of these devices.

Corresponding to the above method implementation, the present specification further provides an implementation of an electronic device. The electronic device includes a processor and a memory configured to store a machine-executable instruction. The processor and the memory are usually connected to each other by using an internal bus. In other possible implementations, the device can further include an external interface for communication with another device or component.

In this implementation, by reading and executing the machine-executable instruction that is stored in the memory and corresponds to control logic of transaction consensus processing for a blockchain, the processor is configured to: receive a data fragment of transaction data that is sent by a target node in a unicast mode, where the target node that initiates a proposition performs compression processing on the proposed transaction data based on a determined compression algorithm, and fragments the compressed transaction data into a number of data fragments based on an erasure code algorithm, and data fragments sent by the target node to nodes in the unicast mode are different; broadcast the received data fragment to other nodes in a blockchain, and receive data fragments of the transaction data that are broadcast by the other nodes; determine whether a number of received data fragments of the transaction data reaches an erasure code recovery threshold; and if yes, perform data recovery on the received data fragment based on an erasure code reconstruction algorithm, perform decompression processing on the recovered transaction data based on a decompression algorithm corresponding to the compression algorithm to obtain original content of the transaction data, and complete consensus processing on the obtained original content of the transaction data.

In this implementation, by reading and executing the machine-executable instruction that is stored in the memory and corresponds to control logic of transaction consensus processing for a blockchain, the processor is configured to: generate transaction data proposed by a node; perform compression processing on the transaction data proposed by the node based on the determined compression algorithm, and fragment the compressed transaction data into a number of data fragments based on the erasure code algorithm; and send the number of data fragments to other nodes separately in a unicast mode.

In this implementation, a consensus algorithm of the blockchain is a HoneyBadgerBFT algorithm; and by reading and executing the machine-executable instruction that is stored in the memory and corresponds to control logic of transaction consensus processing for a blockchain, the processor is configured to: receive a VAL message sent by the target node in a unicast mode, where the VAL message includes the obtained data fragment of the transaction data; and obtain and store the data fragment in the VAL message.

In this implementation, a consensus algorithm of the blockchain is a HoneyBadgerBFT algorithm; and by reading and executing the machine-executable instruction that is stored in the memory and corresponds to control logic of transaction consensus processing for a blockchain, the processor is configured to: broadcast an ECHO message to the other nodes in the blockchain, where the ECHO message includes the received data fragment, so that upon receiving the ECHO message, the other nodes obtain and store the data fragment in the ECHO message.

In this implementation, a consensus algorithm of the blockchain is a PBFT algorithm; and by reading and executing the machine-executable instruction that is stored in the memory and corresponds to control logic of transaction consensus processing for a blockchain, the processor is configured to: receive a pre-prepare message sent by the target node in a unicast mode, where the pre-prepare message includes the obtained data fragment of the transaction data; and obtain and store the data fragment in the pre-prepare message.

In this implementation, by reading and executing the machine-executable instruction that is stored in the memory and corresponds to control logic of transaction consensus processing for a blockchain, the processor is configured to: broadcast a prepare message to the other nodes in the blockchain, where the prepare message includes the received data fragment, so that upon receiving the prepare message, the other nodes obtain and store the data fragment in the prepare message.

In this implementation, by reading and executing the machine-executable instruction that is stored in the memory and corresponds to control logic of transaction consensus processing for a blockchain, the processor is configured to: perform encryption processing on the proposed transaction data based on a determined encryption algorithm and an encryption key; and fragment the encrypted transaction data into the number of data fragments based on the erasure code algorithm.

In this implementation, by reading and executing the machine-executable instruction that is stored in the memory and corresponds to control logic of transaction consensus processing for a blockchain, the processor is configured to: perform data recovery on the received data fragment based on the erasure code reconstruction algorithm; and obtain the original content of the transaction data by performing decryption processing on a recovered transaction data based on a decryption algorithm corresponding to the encryption algorithm and a decryption key corresponding to the encryption key.

In this implementation, the encryption algorithm is a threshold encryption algorithm, the decryption algorithm is a threshold decryption algorithm corresponding to the threshold encryption algorithm, the decryption key is fragmented into a number of sub-keys, and the sub-keys are held by nodes respectively; and by reading and executing the machine-executable instruction that is stored in the memory and corresponds to control logic of transaction consensus processing for a blockchain, the processor is configured to: collect sub-keys held by the other nodes; determine whether the number of collected sub-keys reaches a determined, e.g., predetermined or dynamically determined, decryption threshold; and if yes, reconstruct the decryption key based on the collected sub-keys, and perform decryption processing on the recovered transaction data based on the threshold decryption algorithm corresponding to the threshold encryption algorithm and the decryption key.

A person skilled in the art can easily figure out other implementations of the present specification after considering the present specification and practicing the present disclosure herein. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and the implementations are merely considered as examples, and the actual scope and the spirit of the present specification are pointed out by the following claims.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 4:
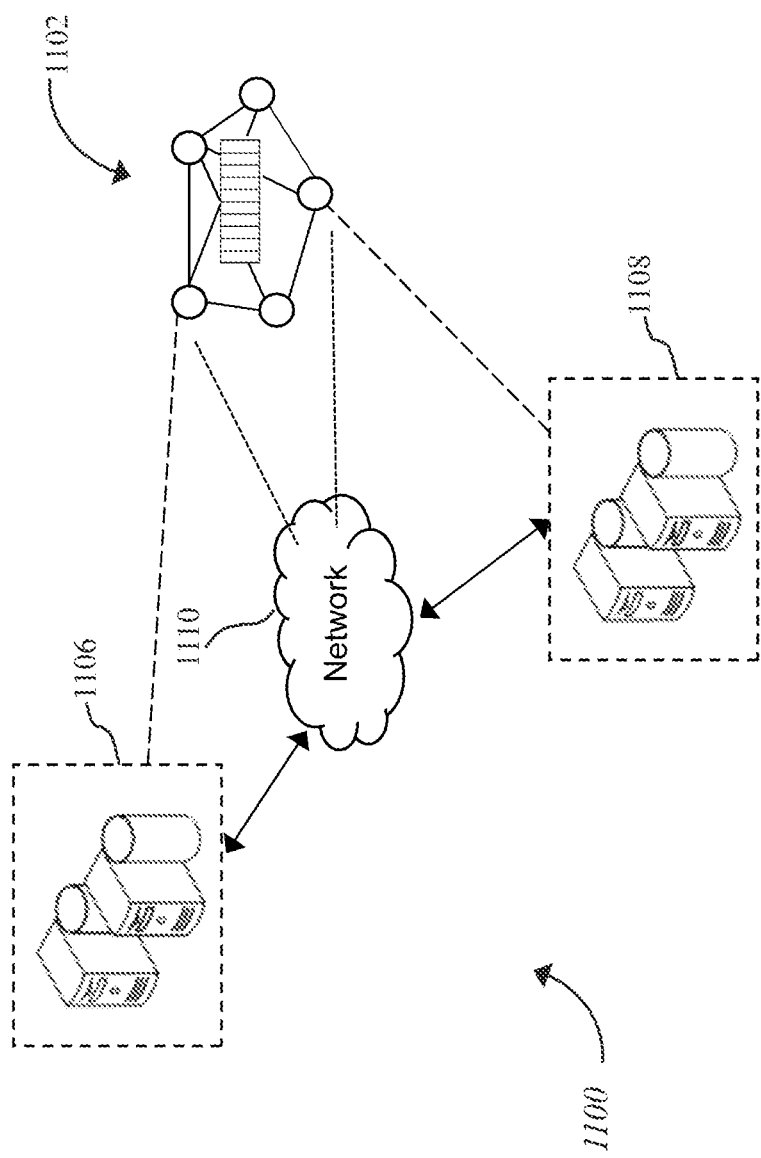
FIG. 4 is a diagram illustrating example environments that can be used to execute embodiments of this specification.

FIG. 4 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 4, the consortium blockchain network 1102 is represented as a peer-to-peer network of nodes, and the computing systems 1106, 1108 provide nodes of the first entity and second entity, respectively, which participate in the consortium blockchain network 1102.

Figure 5:
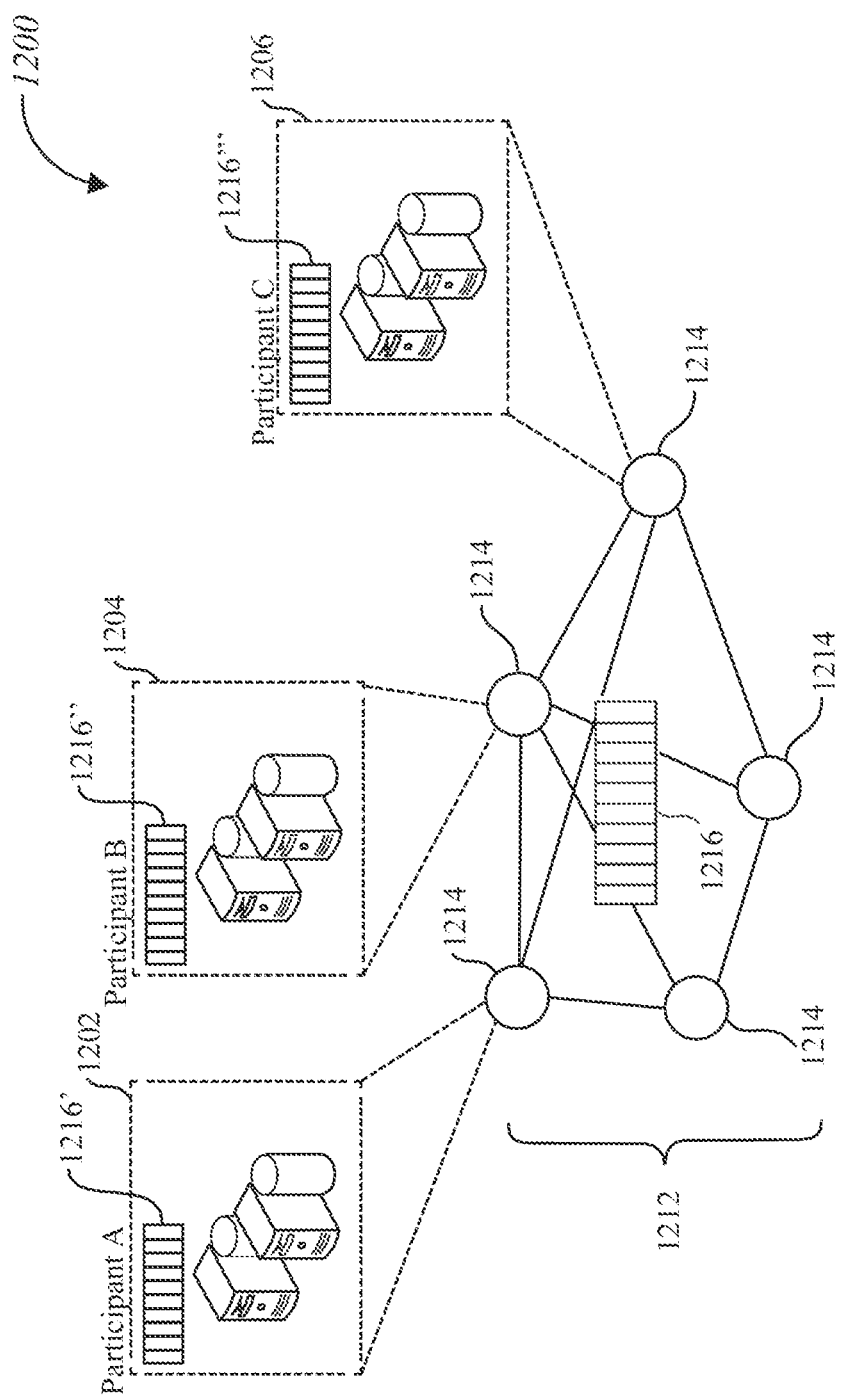
FIG. 5 is a diagram illustrating an example architecture in accordance with embodiments of this specification.

FIG. 5 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 5, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 2, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 5, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 5, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 5, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 1100 of FIG. 4 and using the blockchain architecture 1200 of FIG. 5. For example, transaction information of a logistic process is stored as blocks in the blockchain 1216.

It should be understood that the present specification is not limited to the precise structures that have been described above and shown in the drawings, and various modifications and changes can be made without departing from the scope of the present specification. The scope of the present specification is limited by the appended claims only.

The above descriptions are merely preferred implementations of the present specification, but are not intended to limit the present specification. Any modification, equivalent replacement, or improvement made without departing from the spirit and principle of the present specification shall fall within the protection scope of the present specification.

What is claimed is:

1. A method, comprising:
at a first node of a blockchain network:
performing compression processing on transaction data based on a compression algorithm to obtain compressed transaction data;
fragmenting the compressed transaction data into a plurality of data fragments based on an erasure code algorithm; and
sending each data fragment of the plurality of data fragments to a respective node of the blockchain network separately in a unicast mode, wherein at least a data fragment sent to a second node of the blockchain network is different from a data fragment sent to a third node of the blockchain network.

2. The method of claim 1, comprising:
receiving a data fragment of the data fragments that have been sent in the unicast mode and is broadcast among the nodes of the blockchain network by another node of the blockchain network;
determining whether a number of data fragments of the compressed transaction data received at the first node reaches an erasure code recovery threshold;
in response to determining that the number of the data fragments of the compressed transaction data received at the first node reaches the erasure code recovery threshold, performing data recovery by the first node on the data fragments received at the first node based on an erasure code reconstruction algorithm to generate recovered transaction data.

3. The method of claim 2, comprising:
performing decompression processing on the recovered transaction data based on a decompression algorithm corresponding to the compression algorithm to obtain an original content of the transaction data; and
adding the original content of the transaction data into a copy of a blockchain stored by the first node.

4. The method according to claim 1, wherein a consensus algorithm of the blockchain network is a HoneyBadgerBFT algorithm; and
wherein the sending each data fragment of the plurality of data fragments includes sending each data fragment of the data fragments through a VAL message, the VAL message including the data fragment.

5. The method according to claim 2, wherein a consensus algorithm of the blockchain network is a HoneyBadgerBFT algorithm; and
wherein the receiving the data fragment includes receiving an ECHO message and obtaining the data fragment from the ECHO message.

6. The method according to claim 1, wherein a consensus algorithm of the blockchain network is a practical Byzantine fault tolerance (PBFT) algorithm; and
the sending each data fragment of the plurality of data fragments includes sending each data fragment of the data fragments through a pre-prepare message, the pre-prepare message including the data fragment of the compressed transaction data.

7. The method according to claim 2, wherein a consensus algorithm of the blockchain network is a practical Byzantine fault tolerance (PBFT) algorithm; and
wherein the receiving the data fragment includes receiving a prepare message and obtaining the data fragment from the prepare message.

8. A system, comprising:
a processor; and a memory storing machine-executable instructions, the machine-executable instructions, when executed by the processor, enable the processor to implement acts including:
- at a first node of a blockchain network:
  - performing compression processing on transaction data based on a compression algorithm to obtain compressed transaction data;
  - fragmenting the compressed transaction data into a plurality of data fragments based on an erasure code algorithm; and
  - sending each data fragment of the plurality of data fragments to a respective node of the blockchain network separately in a unicast mode, wherein at least a data fragment sent to a second node of the blockchain network is different from a data fragment sent to a third node of the blockchain network.

9. The system according to claim 8, wherein a consensus algorithm of the blockchain network is a HoneyBadgerBFT algorithm; and
- wherein the sending each data fragment of the plurality of data fragments includes sending each data fragment of the data fragments through a VAL message, the VAL message including the data fragment.

10. The system according to claim 8, wherein a consensus algorithm of the blockchain network is a practical Byzantine fault tolerance (PBFT) algorithm; and
- the sending each data fragment of the plurality of data fragments includes sending each data fragment of the data fragments through a pre-prepare message, the pre-prepare message including the data fragment of the compressed transaction data.

11. A non-transitory storage medium having executable instructions stored thereon, the executable instructions, when executed by a processor, enable the processor to implement acts comprising:
- at a first node of a blockchain network:
  - performing compression processing on transaction data based on a compression algorithm to obtain compressed transaction data;
  - fragmenting the compressed transaction data into a plurality of data fragments based on an erasure code algorithm; and
  - sending each data fragment of the plurality of data fragments to a respective node of the blockchain network separately in a unicast mode, wherein at least a data fragment sent to a second node of the blockchain network is different from a data fragment sent to a third node of the blockchain network.

12. The storage medium of claim 11, wherein the acts include:
- receiving a data fragment of the data fragments that have been sent in the unicast mode and is broadcast among the nodes of the blockchain network by another node of the blockchain network;
- determining whether a number of data fragments of the compressed transaction data received at the first node reaches an erasure code recovery threshold;
- in response to determining that the number of the data fragments of the compressed transaction data received at the first node reaches the erasure code recovery threshold, performing data recovery by the first node on the data fragments received at the first node based on an erasure code reconstruction algorithm to generate recovered transaction data.

13. The storage medium of claim 12, wherein the acts include:
- performing decompression processing on the recovered transaction data based on a decompression algorithm corresponding to the compression algorithm to obtain original content of the transaction data; and
- adding the original content of the transaction data into a copy of a blockchain stored by the first node.

14. The storage medium according to claim 11, wherein a consensus algorithm of the blockchain network is a HoneyBadgerBFT algorithm; and
- wherein the sending each data fragment of the plurality of data fragments includes sending each data fragment of the data fragments through a VAL message, the VAL message including the data fragment.

15. The storage medium according to claim 12, wherein a consensus algorithm of the blockchain network is a HoneyBadgerBFT algorithm; and
- wherein the receiving the data fragment includes receiving an ECHO message and obtaining the data fragment from the ECHO message.

16. The storage medium according to claim 11, wherein a consensus algorithm of the blockchain network is a practical Byzantine fault tolerance (PBFT) algorithm; and
- wherein the sending each data fragment of the plurality of data fragments includes sending each data fragment of the data fragments through a pre-prepare message, the pre-prepare message including the data fragment of the compressed transaction data.

17. The storage medium according to claim 12, wherein a consensus algorithm of the blockchain network is a practical Byzantine fault tolerance (PBFT) algorithm; and
- wherein the receiving the data fragment includes receiving a prepare message and obtaining the data fragment from the prepare message.

18. The storage medium according to claim 11, wherein the acts include:
- at the second node of the blockchain network:
  - receiving a first data fragment of the data fragments of the compressed transaction data;
  - broadcasting the first data fragment to the nodes of the blockchain network;
  - receiving a second data fragment of the compressed transaction data that is broadcast by the third node of the blockchain network;
  - determining whether a number of data fragments of the compressed transaction data received at the first node reaches an erasure code recovery threshold;
  - in response to determining that the number of the data fragments of the compressed transaction data received at the first node reaches the erasure code recovery threshold, performing data recovery by the first node on the data fragments received at the first node based on an erasure code reconstruction algorithm to generate a recovered transaction data.

19. The storage medium according to claim 18, wherein the acts include:
- at the second node, performing decompression processing on the recovered transaction data based on a decompression algorithm corresponding to the compression algorithm to obtain an original content of the transaction data.

20. The storage medium according to claim 18, wherein a consensus algorithm of the blockchain network is a practical Byzantine fault tolerance (PBFT) algorithm; and
- wherein the broadcasting the first data fragment to the nodes of the blockchain network includes broadcasting a prepare message to the nodes, the prepare message including the first data fragment.

* * * * *